United States Patent
Walton et al.

(10) Patent No.: US 8,478,776 B2
(45) Date of Patent: Jul. 2, 2013

(54) METHODS AND SYSTEMS FOR PEER-TO-PEER NETWORK DISCOVERY USING MULTI-USER DIVERSITY

(75) Inventors: J. Rodney Walton, San Diego, CA (US); John W. Ketchum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 667 days.

(21) Appl. No.: 12/610,255

(22) Filed: Oct. 30, 2009

(65) Prior Publication Data

US 2011/0106837 A1    May 5, 2011

(51) Int. Cl.
   *G06F 17/00*    (2006.01)
(52) U.S. Cl.
   USPC ............... 707/769; 709/226; 709/248
(58) Field of Classification Search
   USPC .................. 707/769; 709/226, 248
   See application file for complete search history.

(56) References Cited

U.S. PATENT DOCUMENTS

| | | | |
|---|---|---|---|
| 6,604,140 B1 | 8/2003 | Beck et al. |
| 6,633,757 B1 | 10/2003 | Hermann et al. |
| 6,909,721 B2 | 6/2005 | Ekberg et al. |
| 7,293,080 B1 | 11/2007 | Clemm et al. |
| 7,379,958 B2 | 5/2008 | Karhu |
| 7,386,459 B2 | 6/2008 | English |
| 7,440,994 B2 | 10/2008 | Harrow et al. |
| 7,457,304 B2 | 11/2008 | Roh et al. |
| 7,492,777 B2 | 2/2009 | Ekberg et al. |
| 7,499,981 B2 | 3/2009 | Harrow et al. |
| 7,516,201 B2 | 4/2009 | Kovacs et al. |
| 7,546,363 B2 | 6/2009 | Harrow et al. |
| 7,562,112 B2 | 7/2009 | Harrow et al. |
| 7,590,097 B2 | 9/2009 | Ekberg et al. |
| 7,631,033 B2 | 12/2009 | Zehler |
| 7,647,012 B2 | 1/2010 | Yamada et al. |
| 7,647,021 B2 | 1/2010 | Moore et al. |
| 7,656,822 B1 | 2/2010 | Abdelaziz et al. |
| 7,714,911 B2 | 5/2010 | Yoshida |
| 7,734,717 B2 | 6/2010 | Saarimaki et al. |
| 7,769,837 B2 | 8/2010 | Nogawa et al. |
| 7,844,738 B2 | 11/2010 | Eytchison |
| 7,904,561 B2 | 3/2011 | Chan et al. |
| 7,921,155 B2 | 4/2011 | Harrow et al. |

(Continued)

FOREIGN PATENT DOCUMENTS

| EP | 1542409 A1 | 6/2005 |
|---|---|---|
| EP | 1677462 A1 | 7/2006 |

(Continued)

OTHER PUBLICATIONS

T. Clausen and P. Jacquet, "Optimized Link State Routing Protocol" IETF draft, Oct. 2003.

(Continued)

*Primary Examiner* — Belix M Ortiz Ditren
(74) *Attorney, Agent, or Firm* — QUALCOMM Patent Group; James Hunt Yancey, Jr.

(57) ABSTRACT

A collection of nodes in a peer-to-peer (P2P) network can have a larger aggregate coverage footprint than any given single node. This inherent multi-site property of P2P wireless networks can provide each node with benefits of multi-user diversity. This can improve the effective coverage of nodes within a P2P wireless network and improve discovery of devices in the P2P network.

48 Claims, 6 Drawing Sheets

U.S. PATENT DOCUMENTS

| | | |
|---|---|---|
| 2006/0178924 A1 | 8/2006 | Yagiura |
| 2006/0235958 A1 | 10/2006 | Motoyama |
| 2007/0060160 A1 | 3/2007 | Hur et al. |
| 2007/0116031 A1 | 5/2007 | Chung et al. |
| 2007/0141986 A1 | 6/2007 | Kuehnel et al. |
| 2007/0153717 A1 | 7/2007 | Tervonen et al. |
| 2007/0195746 A1 | 8/2007 | Ryu et al. |
| 2007/0283018 A1 | 12/2007 | Yun |
| 2008/0123558 A1 | 5/2008 | Chhabra |
| 2008/0140835 A1* | 6/2008 | Bradley et al. ............ 709/225 |
| 2008/0250160 A1 | 10/2008 | Hall |
| 2008/0298329 A1 | 12/2008 | Mo et al. |
| 2009/0029691 A1 | 1/2009 | Shen et al. |
| 2009/0029699 A1 | 1/2009 | Luukkala et al. |
| 2009/0036063 A1 | 2/2009 | Zuniga et al. |
| 2009/0059890 A1 | 3/2009 | Cordeiro et al. |
| 2009/0061784 A1 | 3/2009 | Cordeiro |
| 2009/0092105 A1 | 4/2009 | Chou |
| 2009/0106810 A1 | 4/2009 | Stoye et al. |
| 2009/0213771 A1 | 8/2009 | Celentano et al. |
| 2009/0219947 A1 | 9/2009 | Kariya |
| 2009/0274166 A1 | 11/2009 | Zhang et al. |
| 2009/0290528 A1 | 11/2009 | Kwon et al. |
| 2010/0097946 A1 | 4/2010 | Celentano et al. |
| 2010/0118785 A1 | 5/2010 | Sugaya |
| 2010/0165925 A1 | 7/2010 | Del Prado Pavon et al. |
| 2010/0260042 A1 | 10/2010 | Kwon et al. |
| 2011/0044280 A1 | 2/2011 | Zhai |
| 2011/0055326 A1 | 3/2011 | Michaelis et al. |
| 2011/0069187 A1 | 3/2011 | Yokota |
| 2011/0113085 A1 | 5/2011 | Manor et al. |
| 2011/0205962 A1 | 8/2011 | Das et al. |
| 2012/0033585 A1 | 2/2012 | Michaelis et al. |

FOREIGN PATENT DOCUMENTS

| | | |
|---|---|---|
| JP | 2009055246 A | 3/2009 |
| JP | 2011521583 A | 7/2011 |
| WO | WO2007136622 A2 | 11/2007 |

OTHER PUBLICATIONS

Campo C et al: "PDP: A lightweight discovery protocol for local-scope interactions in wireless ad hoc networks", Computer Networks, Elsevier Science Publishers B.V., Amsterdam, NL, vol. 50, No. 17, Dec. 5, 2006, pp. 3264-3283, XP025182668, ISSN: 1389-1286, DOI: DOI:10.1016/J.COMNET.2005.12.007 [retrieved on Dec. 5, 2006].

Chakraborty D et al: "Toward Distributed Service Discovery in Pervasive Computing Environments", IEEE Transactions on Mobile Computing, IEEE Service Center, Los Alamitos, CA, US LNKD-DOI:10.1109/TMC.2006.26, vol. 5, No. 2, Feb. 1, 2006, pp. 97-112, XP001545958, ISSN: 1536-1233.

ECMA International: "Standard ECMA-368 High Rate Ultra Wideband PHY and MAC Standard 2nd edition" Internet Citation Dec. 1, 2007, pp. I-VIII, 1, XP002563778 Retrieved from the Internet:URL:http://www.ecmainternational.org/publications/files/ECMA-ST/ECMA-368 %202nd%20edition%20December%202007.pdf [retrieved on Jan. 18, 2010].

Fan et al: "Bandwidth allocation in UWB WPANs with ECMA-368 MAC", Computer Communications, Elsevier Science Publishers BV, Amsterdam, NL, vol. 32, No. 5, Mar. 27, 2009 , pp. 954-960, XP026001994, ISSN: 0140-3664, DOI: DOI:10.1016/J.COMCOM. 2008.12.024 [retrieved on Dec. 30, 2008] abstract section 2. Proposed MAS allocation method.

Gunther Auer, "Contention Free Dynamic Slot Allocation in Cellular Networks," Sarnoff Symposium 2009.

Guttman C Perkins J Kempf Sun Microsystems E: "Service Templates and Service: Schemes; rfc2609.txt", IETF Standard, Internet Engineering Task Force, IETF, CH, Jun. 1, 1999, XP015008392, ISSN: 0000-0003.

International Search Report and Written Opinion—PCT/US2010/054885, International Search Authority—European Patent Office—Mar. 4, 2011.

Sud S, et al., "Enabling rapid wireless system composition through layer-discovery", IEEE Network, IEEE Service Center, New York, NY, US, vol. 22, No. 4, Jul. 1, 2008, pp. 14-20, XP011232023,ISSN, 0890-8044, DOI, DOI,10.1109/MNET.2008.4579766 abstract p. 16, left-hand column, paragraph 1—right-hand column, paragraph 1 p. 18, right-hand column, paragraph 3-6.

Ververidis C N, et al., "Service discovery for mobile Ad Hoc networks, a survey of issues and techniques", IEEE Communications Surveys, IEEE, New York, NY, US, vol. 10, No. 3, Jul. 1, 2008, pp. 30-45, XP011234560, ISSN, 1553-877X, DOI, DOI,10.1109/COMST.2008.4625803 p. 34, left-hand column, paragraph 4—p. 36, left-hand column, paragraph 2.

Wei Kuang Lai, "MARS: a multiple access scheme with sender driven and reception first for smart antenna in ad hoc networks", Wireless Communications and Mobile Computing, Wirel. Commun. Mob. Comput. 2009; 9: 197-208. Published online Apr. 21, 2008 in Wiley InterScience.

Zhensheng Zhang, "Pure Directional Transmission and Reception Algorithms in Wireless Ad Hoc Networks with Directional Antennas," 2005 IEEE International Conference on Communications, May 16-20, 2005, Seoul, Korea.

European Search Report—EP12194583—Search Authority—The Hague—Dec. 13, 2012.

* cited by examiner

METHODS AND SYSTEMS FOR PEER-TO-PEER NETWORK DISCOVERY USING MULTI-USER DIVERSITY

TECHNICAL FIELD

Certain embodiments of the present disclosure generally relate to wireless communications and, more particularly to a method for improving discovery in a peer-to-peer wireless network.

SUMMARY

Certain embodiments of the present disclosure provide a method for wireless communications by a wireless node in a peer-to-peer (P2P) wireless network. The method generally includes maintaining a discovery database of at least one other wireless node of the P2P wireless network, wherein the discovery database comprises a type of each specified wireless node and a class of each offered service, and transmitting the type of each specified wireless node and the class of each offered service within a bit-mapped field of an identifier (ID) discovery probe message.

Certain embodiments of the present disclosure provide a method for wireless communications by a wireless node in a peer-to-peer (P2P) wireless network. The method generally includes maintaining a discovery database of at least one other wireless node of the P2P wireless network, wherein the discovery database comprises a type of each specified wireless node and a class of each offered service, receiving a query for service, wherein the query was transmitted by another wireless node of the P2P wireless network as a part of an identifier (ID) discovery probe message, and scanning the maintained discovery database to determine if there is a service entry matching the received query.

Certain embodiments of the present disclosure provide a method for wireless communications by a wireless node in a peer-to-peer (P2P) wireless network. The method generally includes reading a bit-mapped field of each received identifier (ID) discovery probe message transmitted from at least one other wireless node of the P2P wireless network, and determining, based on the read bit-mapped fields, which of the at least one other wireless node is aware of a service sought by the wireless node.

Certain embodiments of the present disclosure provide a method for wireless communications by a wireless node in a peer-to-peer (P2P) wireless network. The method generally includes generating an identifier (ID) discovery probe message with a query field indicating a service class being sought, and transmitting, to at least one other wireless node of the P2P wireless network, the query field within the ID discovery probe message to search for the service class.

Certain embodiments of the present disclosure provide an apparatus for wireless communications by a wireless node in a peer-to-peer (P2P) wireless network. The apparatus generally includes logic for maintaining a discovery database of at least one other wireless node of the P2P wireless network, wherein the discovery database comprises a type of each specified wireless node and a class of each offered service, and logic for transmitting the type of each specified wireless node and the class of each offered service within an identifier (ID) discovery probe message.

Certain embodiments of the present disclosure provide an apparatus for wireless communications by a wireless node in a peer-to-peer (P2P) wireless network. The apparatus generally includes logic for maintaining a discovery database of at least one other wireless node of the P2P wireless network, wherein the discovery database comprises a type of each specified wireless node and a class of each offered service, logic for receiving a query for service, wherein the query was transmitted by another wireless node of the P2P wireless network as a part of an identifier (ID) discovery probe message, and logic for scanning the maintained discovery database to determine if there is a service entry matching the received query.

Certain embodiments of the present disclosure provide an apparatus for wireless communications by a wireless node in a peer-to-peer (P2P) wireless network. The apparatus generally includes logic for reading identifier (ID) discovery probe messages transmitted from at least one other wireless node of the P2P wireless network, and logic for determining, based on information in the ID discovery probe messages, which of the at least one other wireless node is aware of a service sought by the wireless node.

Certain embodiments of the present disclosure provide an apparatus for wireless communications by a wireless node in a peer-to-peer (P2P) wireless network. The apparatus generally includes logic for generating an identifier (ID) discovery probe message with a query field indicating a service class being sought, and logic for transmitting, to at least one other wireless node of the P2P wireless network, the query field within the ID discovery probe message to search for the service class.

Certain embodiments of the present disclosure provide an apparatus for wireless communications by a wireless node in a peer-to-peer (P2P) wireless network. The apparatus generally includes means for maintaining a discovery database of at least one other wireless node of the P2P wireless network, wherein the discovery database comprises a type of each specified wireless node and a class of each offered service, and means for transmitting the type of each specified wireless node and the class of each offered service within an identifier (ID) discovery probe message.

Certain embodiments of the present disclosure provide an apparatus for wireless communications by a wireless node in a peer-to-peer (P2P) wireless network. The apparatus generally includes means for maintaining a discovery database of at least one other wireless node of the P2P wireless network, wherein the discovery database comprises a type of each specified wireless node and a class of each offered service, means for receiving a query for service, wherein the query was transmitted by another wireless node of the P2P wireless network as a part of an identifier (ID) discovery probe message, and means for scanning the maintained discovery database to determine if there is a service entry matching the received query.

Certain embodiments of the present disclosure provide an apparatus for wireless communications by a wireless node in a peer-to-peer (P2P) wireless network. The apparatus generally includes means for reading identifier (ID) discovery probe messages transmitted from at least one other wireless node of the P2P wireless network, and means for determining, based on information in the ID discovery probe messages, which of the at least one other wireless node is aware of a service sought by the wireless node.

Certain embodiments of the present disclosure provide an apparatus for wireless communications by a wireless node in a peer-to-peer (P2P) wireless network. The apparatus generally includes means for generating an identifier (ID) discovery probe message with a query field indicating a service class being sought, and means for transmitting, to at least one other wireless node of the P2P wireless network, the query field within the ID discovery probe message to search for the service class.

Certain embodiments of the present disclosure provide a software storage apparatus for wireless communications by a wireless node in a peer-to-peer (P2P) wireless network, comprising a computer-readable medium having instructions stored thereon, the instructions being executable by one or more processors. The instructions generally include instructions for maintaining a discovery database of at least one other wireless node of the P2P wireless network, wherein the discovery database comprises a type of each specified wireless node and a class of each offered service, and instructions for transmitting the type of each specified wireless node and the class of each offered service within an identifier (ID) discovery probe message.

Certain embodiments of the present disclosure provide a software storage apparatus for wireless communications by a wireless node in a peer-to-peer (P2P) wireless network, comprising a computer-readable medium having instructions stored thereon, the instructions being executable by one or more processors. The instructions generally include instructions for maintaining a discovery database of at least one other wireless node of the P2P wireless network, wherein the discovery database comprises a type of each specified wireless node and a class of each offered service, instructions for receiving a query for service, wherein the query was transmitted by another wireless node of the P2P wireless network as a part of an identifier (ID) discovery probe message, and instructions for scanning the maintained discovery database to determine if there is a service entry matching the received query.

Certain embodiments of the present disclosure provide a software storage apparatus for wireless communications by a wireless node in a peer-to-peer (P2P) wireless network, comprising a computer-readable medium having instructions stored thereon, the instructions being executable by one or more processors. The instructions generally include instructions for reading identifier (ID) discovery probe messages transmitted from at least one other wireless node of the P2P wireless network, and instructions for determining, based on information in the ID discovery probe messages, which of the at least one other wireless node is aware of a service sought by the wireless node.

Certain embodiments of the present disclosure provide a software storage apparatus for wireless communications by a wireless node in a peer-to-peer (P2P) wireless network, comprising a computer-readable medium having instructions stored thereon, the instructions being executable by one or more processors. The instructions generally include instructions for generating an identifier (ID) discovery probe message with a query field indicating a service class being sought, and instructions for transmitting, to at least one other wireless node of the P2P wireless network, the query field within the ID discovery probe message to search for the service class.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain embodiments and are therefore not to be considered limiting of its scope, for the description may admit to other equally effective embodiments.

DETAILED DESCRIPTION

Figure 1:
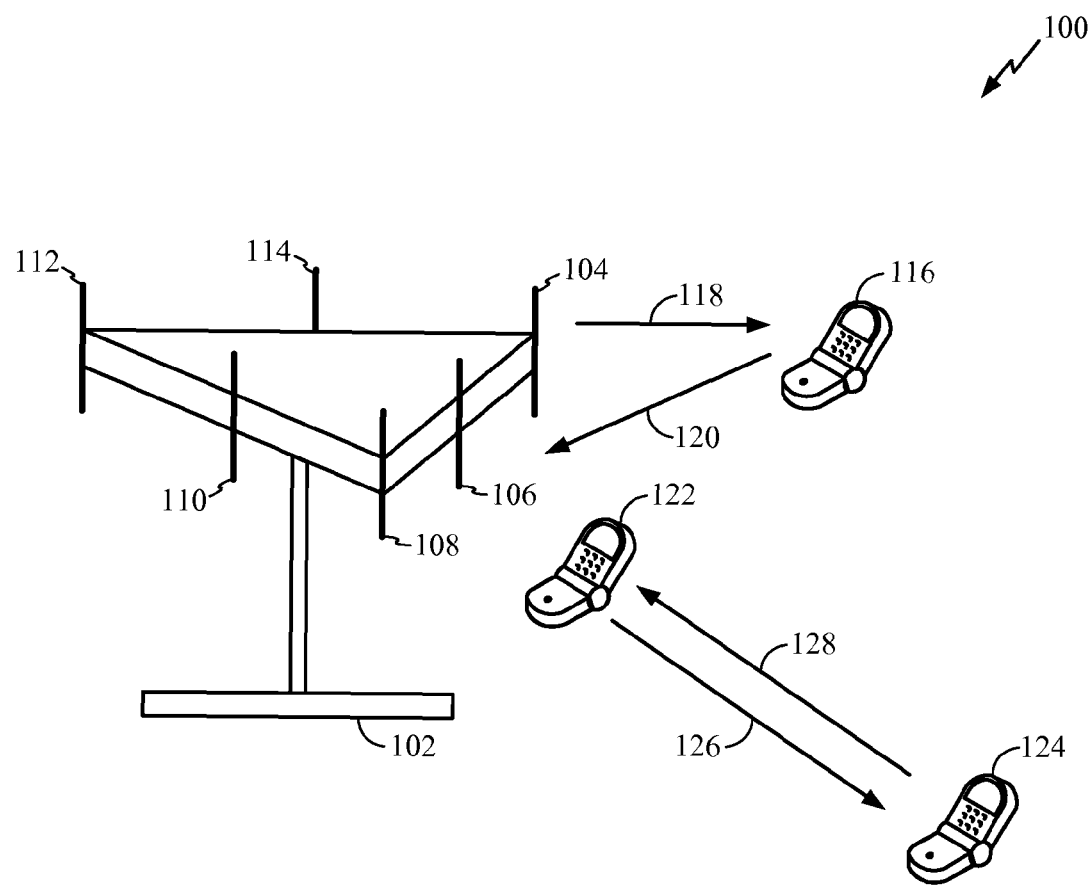
FIG. 1 illustrates an example wireless communication system in accordance with certain embodiments of the present disclosure.

Various embodiments are described more fully hereinafter with reference to the accompanying drawings. This disclosure may, however, be embodied in many different forms and should not be construed as limited to any specific structure or function presented throughout this disclosure. Rather, these embodiments are provided so that this disclosure will convey the general scope of the disclosure to those skilled in the art. Based on the teachings herein one skilled in the art should appreciate that the scope of the disclosure is intended to cover any embodiment disclosed herein, whether implemented independently of or combined with any other embodiment of the disclosure. For example, an apparatus may be implemented or a method may be practiced using any number of the embodiments set forth herein. In addition, the scope of the disclosure is intended to cover such an apparatus or method which is practiced using other structure, functionality, or structure and functionality in addition to or other than the various embodiments of the disclosure set forth herein. It should be understood that any embodiment of the disclosure disclosed herein may be embodied by one or more elements of a claim.

The word "exemplary" is used herein to mean "serving as an example, instance, or illustration." Any embodiment or aspect described herein as "exemplary" is not to be construed as preferred or advantageous over other embodiments or aspects. Although particular embodiments are described herein, many variations and permutations of these embodiments fall within the scope of the disclosure. Although some benefits and advantages of the preferred embodiments may be mentioned, the scope of the disclosure is not intended to be limited to particular benefits, uses, or objectives. Rather, embodiments of the disclosure are intended to be broadly applicable to different wireless technologies, system configurations, networks, and transmission protocols, some of which are illustrated by way of example in the figures and in the following description of the preferred embodiments. The detailed description and drawings are merely illustrative of the disclosure rather than limiting, the scope of the disclosure being defined by the appended claims and equivalents thereof.

A peer-to-peer (P2P) wireless network is designed to operate in a manner where all devices share a common wireless resource (i.e., spectrum) for both receive and transmit operations (i.e., time-division duplex scheme). A key objective of the P2P network is to facilitate discovery. i.e., the act of discovering devices in the radio frequency (RF) vicinity that a terminal can make a connection with (i.e., receive from and transmit to). The interconnection of P2P devices constitutes the network.

The discovery process generally requires P2P devices to periodically transmit an identifier (ID) probe message (possibly at pseudorandom times) intended to be received by other P2P devices in the RF vicinity. In general, a P2P device spends a majority of its time listening for ID probes from other devices, and very small amount of time transmitting its own ID probe message.

An ID probe message typically includes various types of information, such as a unique ID of the device, a location of the device (if available), and a specific service advertised by the device. All P2P devices create and maintain a "discovery" database of other P2P devices in the RF vicinity. The discovery database then contains the information collected from the received ID probes.

The coverage around a specific node (i.e. device) in the P2P network is typically non-uniform and severely constrained compared to that of, for example, a macrocell, a microcell or even a picocell. This is because many of the P2P devices are often buried in the local clutter and the propagation conditions can be highly variable, leading to large path-losses due to shadowing and building penetration losses. Because of the large degree of variability in the propagation, a device advertising a desired service may be discovered even if it is far away from a searching node (e.g., 1 km), while another device advertising the same desired service much closer to the searching node may not been discovered because of excessive path loss specific to the geometry and topology of the P2P network.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

Referring now to FIG. 1, illustrated is a wireless communication system 100 in accordance with various embodiments of the present disclosure. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Additionally, base station 102 can be a home base station, a Femto base station, and/or the like.

Base station 102 can communicate with one or more devices such as device 116; however, it is to be appreciated that base station 102 can communicate with substantially any number of devices similar to device 116. As depicted, device 116 is in communication with antennas 104 and 106, where antennas 104 and 106 transmit information to device 116 over a forward link 118 and receive information from device 116 over a reverse link 120. In a frequency division duplex (FDD) system, forward link 118 can utilize a different frequency band than that used by reverse link 120, for example. Further, in a time division duplex (TDD) system, forward link 118 and reverse link 120 can utilize a common frequency band.

In addition, devices 122 and 124 can be communicating with one another, such as in a peer-to-peer configuration. Moreover, device 122 is in communication with device 124 using links 126 and 128. In a peer-to-peer ad hoc network, devices within range of each other, such as devices 122 and 124, communicate directly with each other without a base station 102 and/or a wired infrastructure to relay their communication. Additionally, peer devices or nodes can relay traffic. The devices communicating in a peer-to-peer (P2P) manner can function similar to base stations and relay traffic or communications to other devices, until the traffic reaches its ultimate destination. The devices can also transmit control channels, which carry information that can be utilized to manage the data transmission between peer nodes.

A communication network can include any number of devices or nodes that are in wireless (or wired) communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and/or intermediate node and can perform functions of either sending and/or receiving information at substantially the same time (e.g., can broadcast or communicate information at about the same time as receiving information) or at different times.

System 100 can be configured to allow nodes that have initiated a communication session over a network to move the session to a direct connection. Nodes that are directly connected can exchange packets natively without any encapsulation. In accordance with some embodiments, a "homeless" node can switch to a wireless network without losing its ongoing sessions. By "homeless" it is meant a node that does not have any home agent entity to provide assistance for keeping ongoing sessions alive while switching to foreign networks nor to forward any new incoming request(s) to establish new sessions to the node's current location. In accordance with some embodiments, nodes can be mobile (e.g., wireless), static (e.g., wired), or combinations thereof (e.g., one node static and a second node mobile, both nodes mobile, and so forth).

Figure 2:
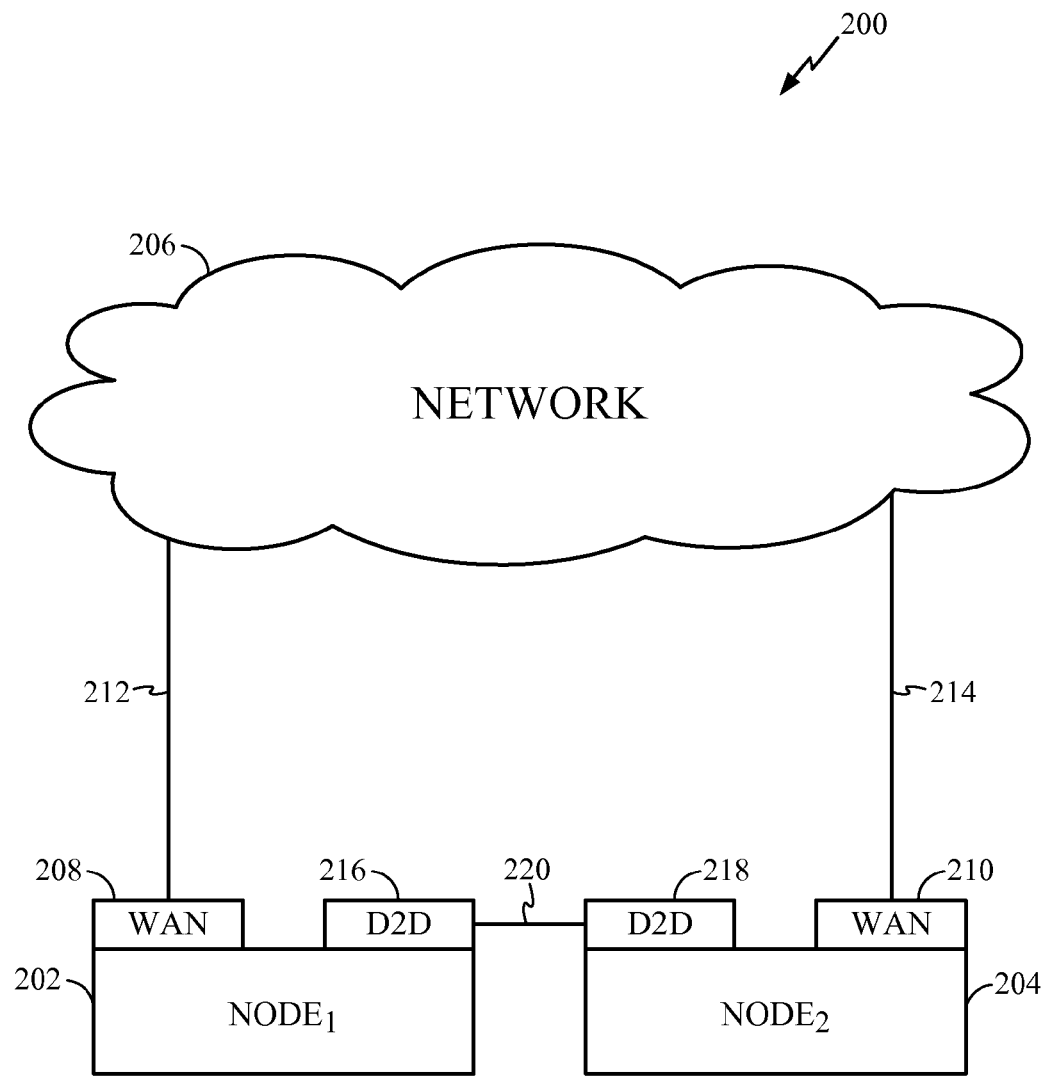
FIG. 2 illustrates a system that allows two nodes to communicate in accordance with certain embodiments of the present disclosure.

FIG. 2 illustrates a system 200 that allows two nodes to communicate over a Wide Area Network interface and/or a Device to Device interface, according to various embodiments. Included in system 200 are a first node (Node1) 202 and a second node (Node2) 204. Each node 202, 204 includes at least two interfaces. A first interface can be connected to a network 206 that provides Internet Protocol (IP) addresses. For example, the network can be a Wide Area Network (WAN), a Local Area Network (LAN), a home network, Digital Subscriber Line (DSL), cable, 3GPP based, 3GPP2 based, wireless LAN (WLAN) based, Worldwide Interoperability for Microwave Access (WiMAX) based, or any other technology providing interconnectivity and routing to a network of interest (e.g., Internet, Extranet, etc.).

Interfaces of nodes 202 and 204 can be wired (e.g., Device to Device), wireless (e.g., WAN), or combinations thereof. For example, Node1 interface can be wireless and Node2 interface can be wired, or Node2 interface can be wireless and Node1 interface can be wired, or both interfaces can be wireless or wired.

For illustration purposes, the first interface of each node 202, 204 is a WAN interface, 208 and 210. WAN interfaces 208, 210 provide a connection over network 206, illustrated by links 212 and 214. Further, each node 202, 204 includes at least a second interface that is connected to a local network with directly connected peers or a multi-hop mesh network. For example, the local network can be a Wireless Local Area Network (WLAN) or another device to device (e.g., peer to peer) technology. For illustration purposes, the second interface of each node 202, 204 is illustrated as a Device to Device (D2D) interface 216, 218. The D2D interfaces 216, 218 allow nodes 202, 204 to perform direct communications, illustrated by direct link 220.

A procedure according to various embodiments for starting a session over network 206 and moving to a direct session (e.g., over direct link 220) will now be described. For example purposes, it is assumed that node1 202 utilizes Mobile Internet Protocol. Communications are performed by node1 202 utilizing its Mobile IP home address as a source address. A home address is a unicast routable address assigned to a node and is used as the permanent address of the node. Node$_1$ 202 communicates with node$_2$ 204 over network 206 (e.g., WAN) by sending and receiving packets over respective first interfaces (e.g., WAN interfaces 208, 210). The packets can be encapsulated in a MIPv6 tunnel to a home agent, which can be included in network 206 according to various embodiments, or a route optimization tunnel directly to node$_2$ 204.

Figure 3:
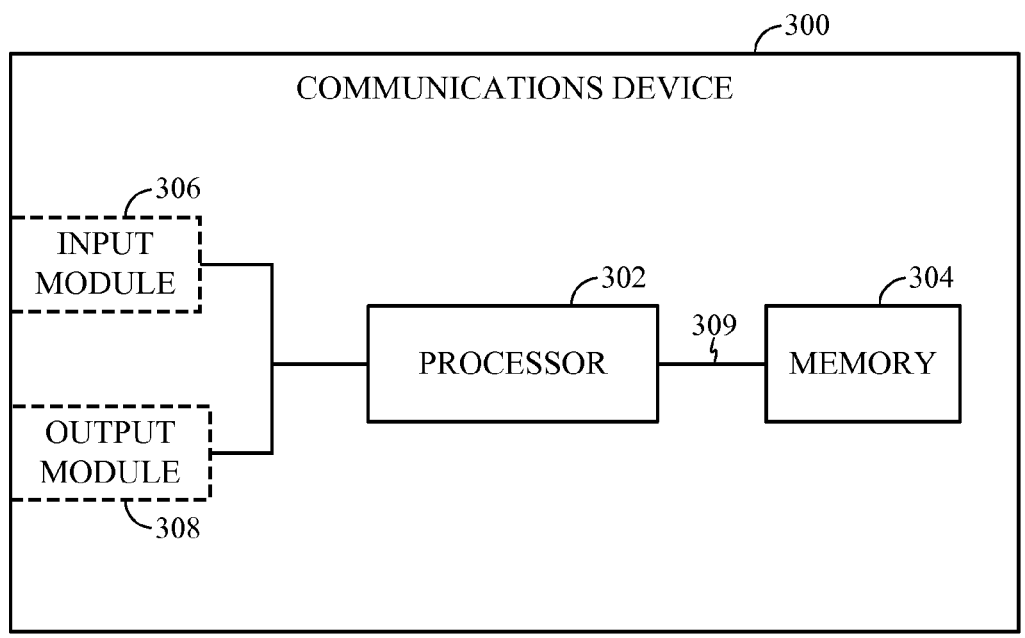
FIG. 3 illustrates an example of a communication device in accordance with certain embodiments of the present disclosure.

FIG. 3 illustrates an exemplary first communications device 300, in accordance with an exemplary embodiment. Exemplary first communications device 300 is, e.g., one of the wireless communications devices (102, 116, 122, 124) of FIG. 1 or one of the wireless communications devices (202, 204) of FIG. 2.

First communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to: receive a first signal from a second communications device; generate a first application alert if said first signal satisfies an application alert criteria; and receive a second signal from an access point said second signal carrying second communications device information based on a previous signal from the second communications device. The access point may be, and sometimes is, a base station. In some embodiments, the second communications device information is location information. In various embodiments, processor 302 is configured to receive said first signal via a wireless peer to peer interface as part of being configured to receive a first signal. In some embodiments, processor 302 is configured to receive the second signal via a wireless wide area network interface as part of being configured to receive the second signal.

Processor 302 is further configured to determine an operation to take based on the second communications device information included in the second signal and information included in said first signal. In one exemplary embodiment, said second communications device information included in the second signal is information on a previous location of said second communications device, said information included in the first signal is current location information, and said operation is one of a location based traffic update operation and a location based advertisement update operation. Processor 302, in some embodiments, is further configured to send an information request signal to the access point requesting information corresponding to the second communications device, in response to the generated first application alert.

Collection of nodes of a peer-to-peer (P2P) wireless network, such as the nodes 202 and 204 of the P2P network 206 from FIG. 2, may provide for a larger aggregate coverage footprint than any given single node. This inherent multi-site property of P2P wireless networks can be exploited to provide each node with benefits of multi-user diversity.

Certain embodiments support that nodes of the P2P network broadcast their advertised service(s) along with the advertised service(s) of all one-hop (i.e., direct-connect) neighbors. This approach may essentially form site diversity since any P2P node entering the neighborhood may get a view of the advertised services from multiple locations. Hence, the multi-user diversity may be present at each node of the P2P wireless network, which may improve service discovery.

Exemplary Sharing of Discovery Database by Broadcasting Service-Probe and Request-Probe Messages Certain embodiments of the present disclosure support sharing of specific information in each of the participating node databases with their connected neighbors. Since the nodes may be distributed in space, each of the nodes may be able to hear different subsets of nodes. A database generated by aggregating the information in a plurality of nodes (e.g., ten or more nodes) may form a more complete view of the nodes in the immediate vicinity than that of any single node. Certain embodiments of the present disclosure also provide a means of sharing the information contained in a given node's database with other nodes that may be connected with this node.

At least two different methods are proposed in the present disclosure for sharing the discovery database information. A number of variations may be derived from these two approaches.

In one embodiment of the present disclosure, each node in a P2P wireless network may maintain a discovery database of devices, each of which may be categorized into a specific type and a service class. These device types and service classes may be conveyed in a bit-mapped field and sent as a part of an identifier (ID) discovery probe for nearby devices to read. If a nearby device is searching for a specific service class, it may read the bitmaps provided by the nodes to which it is connected in order to determine which of these neighbors may be aware of the desired service class being sought. In this case, the node desiring the specific service class may subsequently query one of the neighbors in order to acquire identification information associated with a node offering the sought service. A connection to the desired service class node may then be established on some other transport network that may interconnect all the nodes of the P2P network.

In another embodiment of the present disclosure, the database information may be shared by providing for a query field as a part of the ID discovery probe transmitted by any P2P device seeking a specific service class. This query field may indicate to neighbors of the querying node the specific service class being sought. The neighbor nodes may receive the query, scan their discovery databases to check if they contain an entry that matches the query, and subsequently respond to the query if the queried service entry is found in the maintained discovery database.

In order to ensure that the P2P network is not bogged down in multiple redundant responses, a specific protocol may secure that the responses are randomized or prioritized. Since the nodes not responding immediately may be listening, if they receive the respond to the query, then these nodes may abort their responses. Similarly, the requesting node may send an acknowledgement to the neighbors indicating that its request has been satisfied (i.e., search for the specific service class was successful). A connection to the desired service class node may then be established on some other transport network that interconnects all the nodes of the P2P network.

It should be noted that a responding node may actually be able to respond as a surrogate node. Thus, the responding node may convey, in its response to the request, all of the information that is provided by the desired node's discovery ID probe. Thus, the responding node may effectively act as a repeater or surrogate for the end node.

Figure 4:
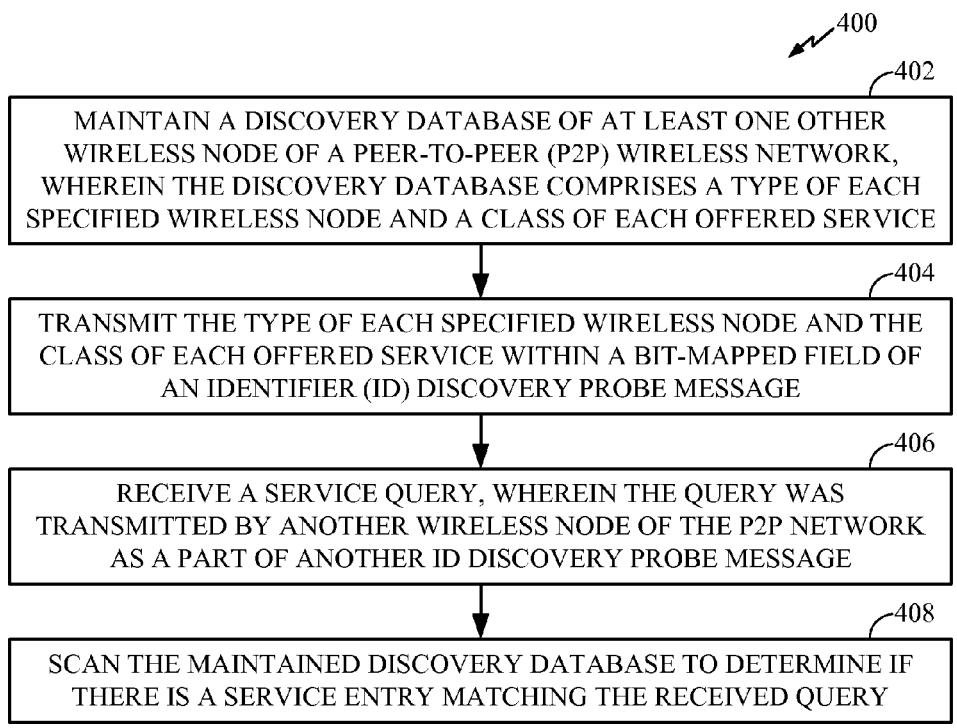
FIG. 4 illustrates example operations for sharing discovery databases of neighboring nodes in a peer-to-peer (P2P) wireless network in accordance with certain embodiments of the present disclosure.

FIG. 4 illustrates example operations 400 for sharing, by a wireless node, discovery databases of neighboring nodes in a P2P wireless network in accordance with certain embodiments of the present disclosure. At 402, a discovery database of at least one other wireless node of the P2P network may be maintained, wherein the discovery database comprises a type of each specified wireless node and a class of each offered service. At 404, the type of each specified wireless node and the class of each offered service may be transmitted within a bit-mapped field of an ID discovery probe message. At 406, a service query may be received at the wireless node, wherein the service query was transmitted by another wireless node of the P2P network as a part of another ID discovery probe message. At 408, the maintained discovery database may be scanned to determine if there is a service entry matching the received service query.

Figure 5:
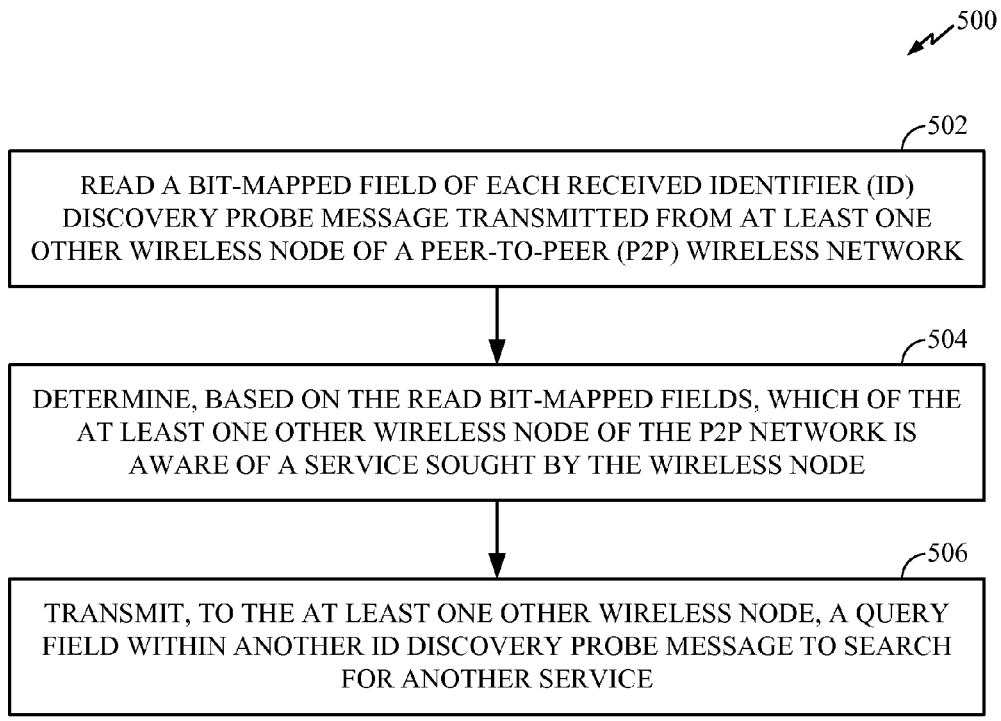
FIG. 5 illustrates example operations for requesting a specific service from the neighboring nodes in the P2P network in accordance with certain embodiments of the present disclosure.

FIG. 5 illustrates example operations 500 for requesting, by a wireless node, a specific service from neighboring nodes in the P2P wireless network in accordance with certain embodiments of the present disclosure. At 502, the wireless node may read a bit-mapped field of each received ID discovery probe message, wherein the ID probe messages were transmitted from at least one other wireless node of the P2P network. At 504, it may be determined, based on the read bit-mapped fields, which of the at least one other wireless node may be aware of a service sought by the wireless node. At 506, a query field may be transmitted to the at least one other wireless node within another ID discovery probe message to query another service.

Exemplary Control Mechanisms in P2P Wireless Networks

Certain embodiments of the present disclosure support certain control mechanisms for managing a system bandwidth and a node battery life in a P2P wireless network. For example, a service announcement frequency may not be a fixed system parameter, but it may be rather adaptive with minimum and maximum rates. A node of the P2P network may adjust its frequency of transmitting service announcements based on dynamics of the P2P network. Thus, a highly static neighborhood may typically result in a lower service announcement frequency than a neighborhood where nodes may come and go more quickly. Also, the service announcement frequency may be lowered with increased node density due to the gain from additional neighbors, and therefore nodes battery life may be extended.

When the density of nodes of the P2P network increases, a number of neighbor nodes associated with any given node may increase. Consequently, the size of the neighbor lists may increase, implying more bandwidth may be utilized for advertising services. The data rate employed by nodes may be made adaptive in order to provide some elasticity in capacity of the system. Thus, a lower data rate may be utilized when the node density is low. On the good side, this may provide for a greater range of the P2P network. Conversely, as the density of nodes increases, the utilized data rate may be also increased. On the other hand, the increase in data rate may reduce a range at which a service announcement message may be received. It should be noted that the data rate may be selected locally. In addition, as the density of nodes increases, a number of services advertised by a given node may be pared, either by capping it or through prioritization.

Figure 6:
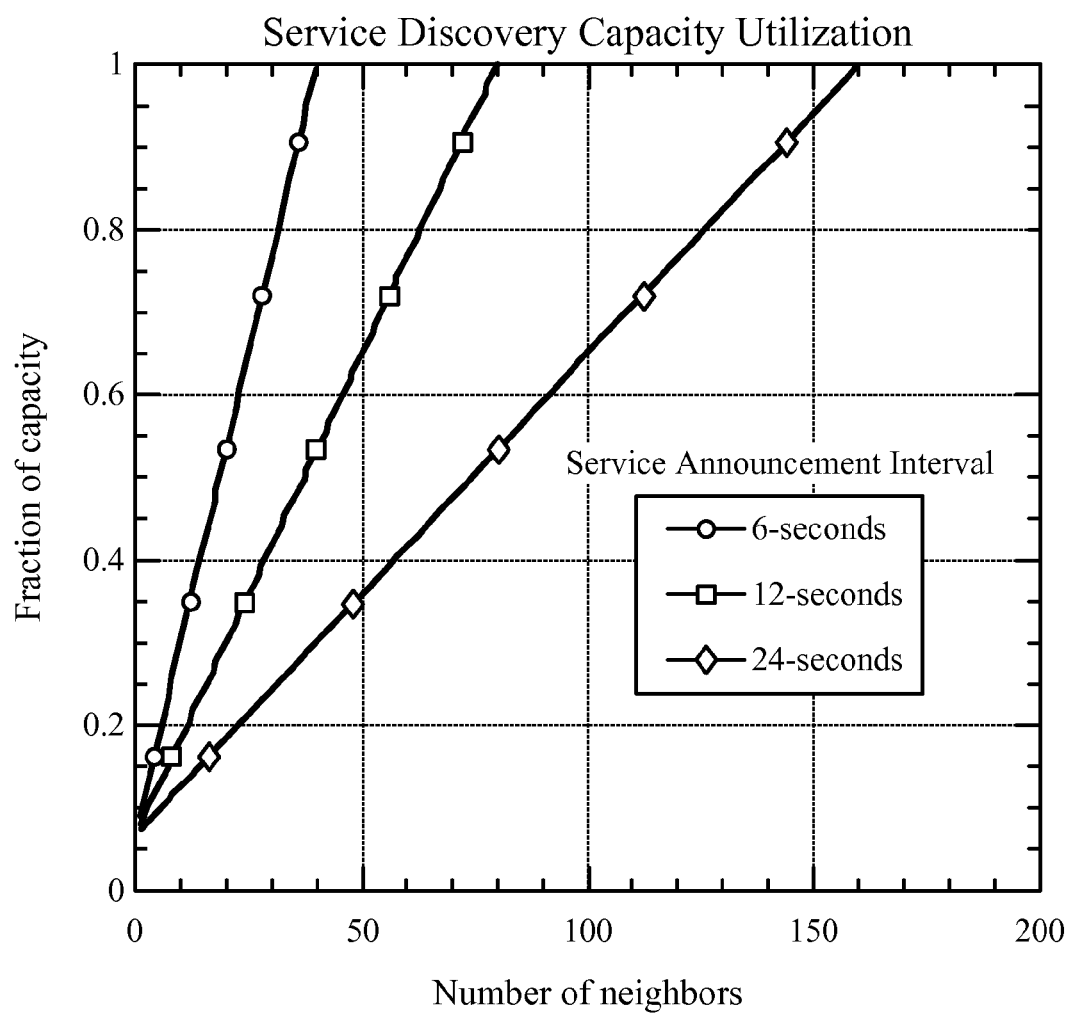
FIG. 6 illustrates an example of capacity utilization of service announcements for different node density of the P2P network in accordance with certain embodiments of the present disclosure.

FIG. 6 illustrates an example of capacity utilization of service announcement messages for different density of nodes in accordance with certain embodiments of the present disclosure. It is considered a 1×Evolution-Data Optimized (1×EVDO) enhanced access channel operating at 9600 bits per second. It can be observed from FIG. 6 that the utilized capacity may be maintained at a constant level when the density of nodes increases (i.e., number of neighbors increases) by decreasing the service announcement frequency (i.e., by increasing the service announcement period).

In summary, in densely populated areas, the overall coverage (i.e., the maximum range of a service, as well as the physical RF coverage) may be smaller, allowing for higher data rates. By combining this with a lower service announcement frequency, the discovery overhead may be maintained at a reasonable level.

Figure 4A:
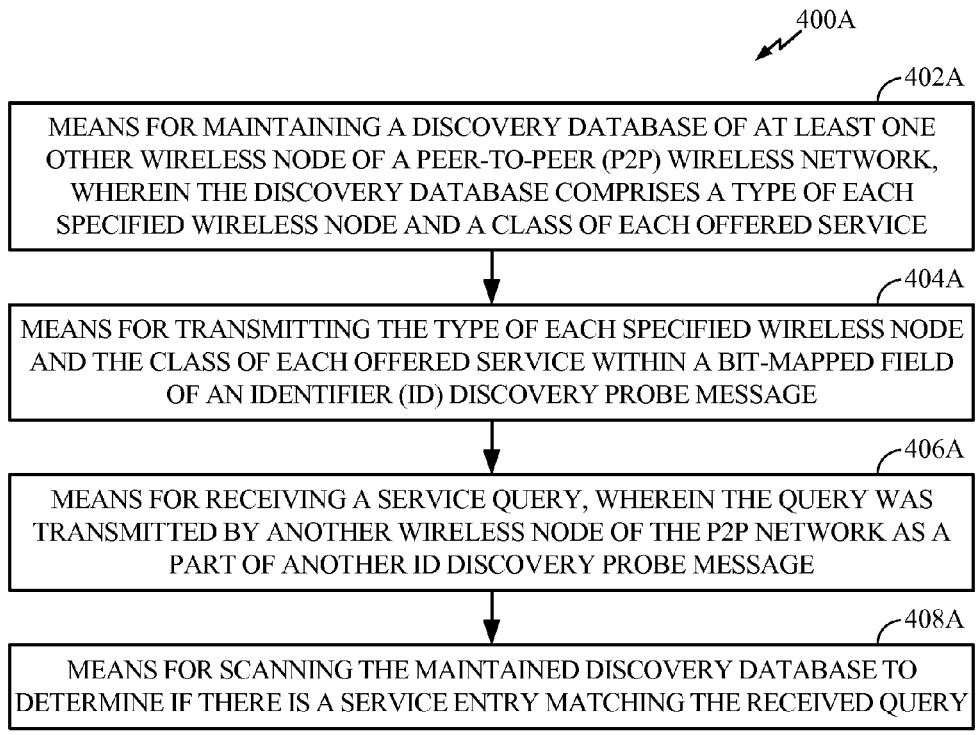
FIG. 4A illustrates example components capable of performing the operations illustrated in FIG. 4.
Figure 5A:
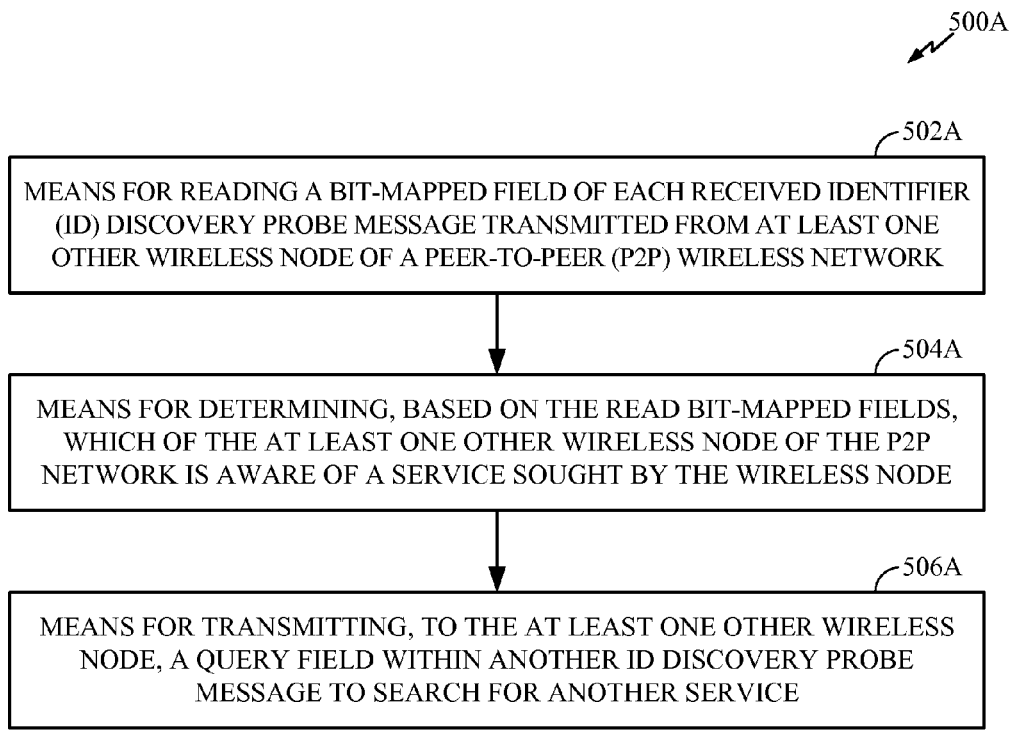
FIG. 5A illustrates example components capable of performing the operations illustrated in FIG. 5.

The various operations of methods described above may be performed by various hardware and/or software component(s) and/or module(s) corresponding to means-plus-function blocks illustrated in the Figures. For example, blocks 402-408 illustrated in FIG. 4 correspond to means-plus-function blocks 402A-408A illustrated in FIG. 4A. Similarly, blocks 502-506 illustrated in FIG. 5 correspond to means-plus-function blocks 502A-506A illustrated in FIG. 5A. More generally, where there are methods illustrated in Figures having corresponding counterpart means-plus-function Figures, the operation blocks correspond to means-plus-function blocks with similar numbering.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium, computer-readable medium or memory unit that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for wireless communications by a wireless node in a peer-to-peer (P2P) wireless network, comprising:
   maintaining a discovery database of at least one other wireless node of the P2P wireless network, wherein the discovery database comprises a type of each specified wireless node and a class of each offered service; and
   transmitting the type of each specified wireless node and the class of each offered service within an identifier (ID) discovery probe message.

2. The method of claim 1, wherein the type of each specified wireless node and the class of each offered service is transmitted within a bit-mapped field of the ID discovery probe message.

3. The method of claim 1, further comprising:
   adjusting a frequency of transmitting service announcements from the discovery database according to dynamics of the P2P wireless network.

4. The method of claim 3, wherein the adjusting comprises adjusting frequency of the service announcements based on node density of the P2P wireless network.

5. A method for wireless communications by a wireless node in a peer-to-peer (P2P) wireless network, comprising:
   maintaining a discovery database of at least one other wireless node of the P2P wireless network, wherein the discovery database comprises a type of each specified wireless node and a class of each offered service;
   receiving a query for service, wherein the query was transmitted by another wireless node of the P2P wireless network as a part of an identifier (ID) discovery probe message; and
   scanning the maintained discovery database to determine if there is a service entry matching the received query.

6. The method of claim 5, further comprising:
   responding to the received query if the service entry that matches the received query is found in the maintained discovery database.

7. The method of claim 5, further comprising:
   listening for one or more responses to the received query, wherein the responses were transmitted from one or more wireless nodes of the P2P wireless network; and
   aborting a response to the received query, if at least one of the responses is received at the wireless node while listening.

8. A method for wireless communications by a wireless node in a peer-to-peer (P2P) wireless network, comprising:
   reading identifier (ID) discovery probe messages transmitted from at least one other wireless node of the P2P wireless network; and
   determining, based on information in the ID discovery probe messages, which of the at least one other wireless node is aware of a service sought by the wireless node, the sought service offered by a wireless node other than the determined wireless node.

9. The method of claim 8, wherein the information in the ID discovery probe message comprises a type of each wireless node and a class of each offered service transmitted within a bit-mapped field of the ID discovery probe message.

10. The method of claim 8, further comprising:
transmitting a query to the determined wireless node to acquire an identification of another wireless node of the P2P wireless network offering the sought service;
establishing connection to the other wireless node associated with the acquired identification.

11. A method for wireless communications by a wireless node in a peer-to-peer (P2P) wireless network, comprising:
generating an identifier (ID) discovery probe message with a query field indicating a service class being sought; and
transmitting, to at least one other wireless node of the P2P wireless network, the query field within the ID discovery probe message to search for the service class.

12. The method of claim 11, further comprising:
transmitting an acknowledgement to the at least one other wireless node indicating the search for the service class was successful.

13. An apparatus for wireless communications by a wireless node in a peer-to-peer (P2P) wireless network, comprising:
logic for maintaining a discovery database of at least one other wireless node of the P2P wireless network, wherein the discovery database comprises a type of each specified wireless node and a class of each offered service; and
logic for transmitting the type of each specified wireless node and the class of each offered service within an identifier (ID) discovery probe message.

14. The apparatus of claim 13, wherein the type of each specified wireless node and the class of each offered service is transmitted within a bit-mapped field of the ID discovery probe message.

15. The apparatus of claim 13, further comprising:
logic for adjusting a frequency of transmitting service announcements from the discovery database according to dynamics of the P2P wireless network.

16. The apparatus of claim 15, wherein the logic for adjusting comprises logic for adjusting frequency of the service announcements based on node density of the P2P wireless network.

17. An apparatus for wireless communications by a wireless node in a peer-to-peer (P2P) wireless network, comprising:
logic for maintaining a discovery database of at least one other wireless node of the P2P wireless network, wherein the discovery database comprises a type of each specified wireless node and a class of each offered service;
logic for receiving a query for service, wherein the query was transmitted by another wireless node of the P2P wireless network as a part of an identifier (ID) discovery probe message; and
logic for scanning the maintained discovery database to determine if there is a service entry matching the received query.

18. The apparatus of claim 17, further comprising:
logic for responding to the received query if the service entry that matches the received query is found in the maintained discovery database.

19. The apparatus of claim 17, further comprising:
logic for listening for one or more responses to the received query, wherein the responses were transmitted from one or more wireless nodes of the P2P wireless network; and logic for aborting a response to the received query, if at least one of the responses is received at the wireless node while listening.

20. An apparatus for wireless communications by a wireless node in a peer-to-peer (P2P) wireless network, comprising:
logic for reading identifier (ID) discovery probe messages transmitted from at least one other wireless node of the P2P wireless network; and
logic for determining, based on information in the ID discovery probe messages, which of the at least one other wireless node is aware of a service sought by the wireless node, the sought service offered by a wireless node other than the determined wireless node.

21. The apparatus of claim 20, wherein the information in the ID discovery probe message comprises a type of each wireless node and a class of each offered service transmitted within a bit-mapped field of the ID discovery probe message.

22. The apparatus of claim 20, further comprising:
logic for transmitting a query to the determined wireless node to acquire an identification of another wireless node of the P2P wireless network offering the sought service;
logic for establishing connection to the other wireless node associated with the acquired identification.

23. An apparatus for wireless communications by a wireless node in a peer-to-peer (P2P) wireless network, comprising:
logic for generating an identifier (ID) discovery probe message with a query field indicating a service class being sought; and
logic for transmitting, to at least one other wireless node of the P2P wireless network, the query field within the ID discovery probe message to search for the service class.

24. The apparatus of claim 23, further comprising:
logic for transmitting an acknowledgement to the at least one other wireless node indicating the search for the service class was successful.

25. An apparatus for wireless communications by a wireless node in a peer-to-peer (P2P) wireless network, comprising:
means for maintaining a discovery database of at least one other wireless node of the P2P wireless network, wherein the discovery database comprises a type of each specified wireless node and a class of each offered service; and
means for transmitting the type of each specified wireless node and the class of each offered service within an identifier (ID) discovery probe message.

26. The apparatus of claim 25, wherein the type of each specified wireless node and the class of each offered service is transmitted within a bit-mapped field of the ID discovery probe message.

27. The apparatus of claim 25, further comprising:
means for adjusting a frequency of transmitting service announcements from the discovery database according to dynamics of the P2P wireless network.

28. The apparatus of claim 27, wherein the means for adjusting comprises means for adjusting frequency of the service announcements based on node density of the P2P wireless network.

29. An apparatus for wireless communications by a wireless node in a peer-to-peer (P2P) wireless network, comprising:
means for maintaining a discovery database of at least one other wireless node of the P2P wireless network, wherein the discovery database comprises a type of each specified wireless node and a class of each offered service;

means for receiving a query for service, wherein the query was transmitted by another wireless node of the P2P wireless network as a part of an identifier (ID) discovery probe message; and means for scanning the maintained discovery database to determine if there is a service entry matching the received query.

30. The apparatus of claim 29, further comprising:

means for responding to the received query if the service entry that matches the received query is found in the maintained discovery database.

31. The apparatus of claim 29, further comprising:

means for listening for one or more responses to the received query, wherein the responses were transmitted from one or more wireless nodes of the P2P wireless network; and means for aborting a response to the received query, if at least one of the responses is received at the wireless node while listening.

32. An apparatus for wireless communications by a wireless node in a peer-to-peer (P2P) wireless network, comprising:

means for reading identifier (ID) discovery probe messages transmitted from at least one other wireless node of the P2P wireless network; and means for determining, based on information in the ID discovery probe messages, which of the at least one other wireless node is aware of a service sought by the wireless node, the sought service offered by a wireless node other than the determined wireless node.

33. The apparatus of claim 32, wherein the information in the ID discovery probe message comprises a type of each wireless node and a class of each offered service transmitted within a bit-mapped field of the ID discovery probe message.

34. The apparatus of claim 32, further comprising:

means for transmitting a query to the determined wireless node to acquire an identification of another wireless node of the P2P wireless network offering the sought service;

means for establishing connection to the other wireless node associated with the acquired identification.

35. An apparatus for wireless communications by a wireless node in a peer-to-peer (P2P) wireless network, comprising:

means for generating an identifier (ID) discovery probe message with a query field indicating a service class being sought; and means for transmitting, to at least one other wireless node of the P2P wireless network, the query field within the ID discovery probe message to search for the service class.

36. The apparatus of claim 35, further comprising:

means for transmitting an acknowledgement to the at least one other wireless node indicating the search for the service class was successful.

37. A software storage apparatus for wireless communications by a wireless node in a peer-to-peer (P2P) wireless network, comprising a computer-readable medium having instructions stored thereon, the instructions being executable by one or more processors and the instructions comprising:

instructions for maintaining a discovery database of at least one other wireless node of the P2P wireless network, wherein the discovery database comprises a type of each specified wireless node and a class of each offered service; and instructions for transmitting the type of each specified wireless node and the class of each offered service within an identifier (ID) discovery probe message.

38. The software storage apparatus of claim 37, wherein the type of each specified wireless node and the class of each offered service is transmitted within a bit-mapped field of the ID discovery probe message.

39. The software storage apparatus of claim 37, wherein the instructions further comprise:

instructions for adjusting a frequency of transmitting service announcements from the discovery database according to dynamics of the P2P wireless network.

40. The software storage apparatus of claim 39, wherein the instructions for adjusting further comprise instructions for adjusting frequency of the service announcements based on node density of the P2P wireless network.

41. A software storage apparatus for wireless communications by a wireless node in a peer-to-peer (P2P) wireless network, comprising a computer-readable medium having instructions stored thereon, the instructions being executable by one or more processors and the instructions comprising:

instructions for maintaining a discovery database of at least one other wireless node of the P2P wireless network, wherein the discovery database comprises a type of each specified wireless node and a class of each offered service;

instructions for receiving a query for service, wherein the query was transmitted by another wireless node of the P2P wireless network as a part of an identifier (ID) discovery probe message; and instructions for scanning the maintained discovery database to determine if there is a service entry matching the received query.

42. The software storage apparatus of claim 41, wherein the instructions further comprise:

instructions for responding to the received query if the service entry that matches the received query is found in the maintained discovery database.

43. The software storage apparatus of claim 41, wherein the instructions further comprise:

instructions for listening for one or more responses to the received query, wherein the responses were transmitted from one or more wireless nodes of the P2P wireless network; and instructions for aborting a response to the received query, if at least one of the responses is received at the wireless node while listening.

44. A software storage apparatus for wireless communications by a wireless node in a peer-to-peer (P2P) wireless network, comprising a computer-readable medium having instructions stored thereon, the instructions being executable by one or more processors and the instructions comprising:

instructions for reading identifier (ID) discovery probe messages transmitted from at least one other wireless node of the P2P wireless network; and instructions for determining, based on information in the ID discovery probe messages, which of the at least one other wireless node is aware of a service sought by the wireless node, the sought service offered by a wireless node other than the determined wireless node.

45. The software storage apparatus of claim 44, wherein the information in the ID discovery probe message comprises a type of each wireless node and a class of each offered service transmitted within a bit-mapped field of the ID discovery probe message.

46. The software storage apparatus of claim 44, wherein the instructions further comprise:
  instructions for transmitting a query to the determined wireless node to acquire an identification of another wireless node of the P2P wireless network offering the sought service;
  instructions for establishing connection to the other wireless node associated with the acquired identification.

47. A software storage apparatus for wireless communications by a wireless node in a peer-to-peer (P2P) wireless network, comprising a computer-readable medium having instructions stored thereon, the instructions being executable by one or more processors and the instructions comprising:
  instructions for generating an identifier (ID) discovery probe message with a query field indicating a service class being sought; and
  instructions for transmitting, to at least one other wireless node of the P2P wireless network, the query field within the ID discovery probe message to search for the service class.

48. The software storage apparatus of claim 47, wherein the instructions further comprise:
  instructions for transmitting an acknowledgement to the at least one other wireless node indicating the search for the service class was successful.

* * * * *